(12) United States Patent
Touze et al.

(10) Patent No.: US 9,979,973 B2
(45) Date of Patent: May 22, 2018

(54) ENCODING AND DECODING METHODS FOR ADAPTING THE AVERAGE LUMINANCE OF HIGH DYNAMIC RANGE PICTURES AND CORRESPONDING ENCODER AND DECODER

(71) Applicant: THOMSON LICENSING, Issy les Moulineaux (FR)

(72) Inventors: David Touze, Rennes (FR); Yannick Olivier, Thorigne Fouillard (FR); Dominique Thoreau, Cesson Sevigne (FR); Catherine Serre, Saint Gregoire (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days. days.

(21) Appl. No.: 14/897,234

(22) PCT Filed: Jun. 2, 2014

(86) PCT No.: PCT/EP2014/061342
§ 371 (c)(1),
(2) Date: Dec. 9, 2015

(87) PCT Pub. No.: WO2014/198574
PCT Pub. Date: Dec. 18, 2014

(65) Prior Publication Data
US 2016/0127736 A1    May 5, 2016

(30) Foreign Application Priority Data
Jun. 10, 2013  (EP) .................................. 13305782

(51) Int. Cl.
*G06K 9/00* (2006.01)
*H04N 19/33* (2014.01)
(Continued)

(52) U.S. Cl.
CPC ............. *H04N 19/33* (2014.11); *H04N 5/202* (2013.01); *H04N 19/61* (2014.11); *H04N 19/98* (2014.11)

(58) Field of Classification Search
CPC ........ H04N 19/33; H04N 5/202; H04N 19/98; H04N 19/61; H04N 19/44; H04N 19/593;
(Continued)

(56) References Cited

U.S. PATENT DOCUMENTS 7,106,505 B2    9/2006 Whitehead et al.
8,289,270 B2   10/2012 Wallener et al.
(Continued)

FOREIGN PATENT DOCUMENTS

CN    CN101743606    6/2010
CN    CN102165513    8/2011
(Continued)

OTHER PUBLICATIONS

ITU-R / WP6C / Contributions, Document 6C/77-E, << Image dynamic range in television systems >>, Oct. 2012 (http://www.itu.int/md/R12-WP6C-C-0077/en).
(Continued)

*Primary Examiner* — Yon Couso
(74) *Attorney, Agent, or Firm* — Brian J. Dorini; Paul P. Kiel

(57) ABSTRACT

A method for encoding a sequence of high dynamic range pictures is disclosed. The method comprises for each picture of the sequence:
  obtaining a value representative of an average luminance of the high dynamic range picture;
  processing the high dynamic range picture so that the value representative of an average luminance of the processed picture is closer to a defined average luminance value than is the value representative of an average luminance of the high dynamic range picture;
(Continued)

decomposing the processed high dynamic range picture in at least one first low dynamic range picture and one second low dynamic range picture of lower resolution representative of a global illumination of the scene; and encoding the first and second low dynamic range pictures and a data function of said value representative of an average luminance of said high dynamic range picture.

25 Claims, 12 Drawing Sheets

(51) Int. Cl.
*H04N 19/61* (2014.01)
*H04N 19/98* (2014.01)
*H04N 5/202* (2006.01)

(58) Field of Classification Search
CPC . G06T 2207/20208; G06T 5/009; G06T 5/50; G06T 2207/10016
See application file for complete search history.

(56) References Cited

U.S. PATENT DOCUMENTS

| | | | |
|---|---|---|---|
| 2006/0002611 | A1 | 5/2006 | Mantiak et al. |
| 2008/0175495 | A1 | 7/2008 | Segall |
| 2009/0175338 | A1* | 7/2009 | Segall ............... H04N 19/30 375/240.14 |
| 2009/0201320 | A1 | 8/2009 | Damberg et al. |
| 2010/0157078 | A1 | 6/2010 | Atanassov et al. |
| 2013/0322532 | A1* | 12/2013 | Efremov ............ H04N 19/136 375/240.12 |
| 2014/0037206 | A1* | 2/2014 | Newton ............. H04N 19/597 382/166 |
| 2016/0205405 | A1* | 7/2016 | Ten ..................... G06T 5/009 382/166 |

FOREIGN PATENT DOCUMENTS

| | | |
|---|---|---|
| KR | 1007101 | 1/2011 |
| WO | WO2002069030 | 9/2002 |
| WO | WO2003077013 | 9/2003 |
| WO | WO2012030526 | 3/2012 |
| WO | WO2012125802 | 9/2012 |
| WO | WO2012147022 | 11/2012 |

OTHER PUBLICATIONS

Koz_etal_Optimized tone mapping with perceptually uniform luminance values, submitted to IEEE Visual Communication and Image Processing Conference (VCIP), 2012.
Lee_etal_Rate distortion optimized compression of high dynamic range videos, EUSIPCO, Aug. 2008.
Mai_etal_Optimizing a Tone Curve for Backward Compatible High Dynamic Range Image and Video Compression, IEEE Transactions on Image Processing, pp. 1558-1571, vol. 20, No. 6, Jun. 2011.
Motra_etal_An adaptive LogLuv transform for high dynamic range video compression, Proc. IEEE ICIP, 2010.
Seetzen_High dynamic range display and projection system, thesis, University of British Columbia, Vancouver, Apr. 2009.
Ward_etal_Subband encoding of high dynamic range imagery, Proc. the 1st Symposium on Applied Perception in Graphics and Visualization, pp. 83-90, Aug. 2004.
Zhang_etal_Perception based high dynamic range video compression with optimal bit depth transformation, Proc. IEEE ICIP, 2011.
Lasserre S etal : "High dynamic range video coding", 16. JCT-VC meeting; Jan. 9, 2014-Jan. 17, 2014; San José; (joint collaborative team on video coding of ISO/IEC JTC1/SC29/WG11 and ITU-T. SG16); URL: http://wftp3.itu.int/av-arch/jctvc-site/,,no JCTVC-P0159-v3, Jan. 15, 2014, XP030115678, the whole document.
Sewoong Oh: "High dynamic range image encoding for brightSide display", Jan. 1, 2006, XP055130767, Retrieved from internet: URL:http://scien.stanford.edu/pages/labsite/2007/psych221/projects/07/HDR_encoding/SewoongOh_report.pdfretrieved on Jul. 22, 2014, cited in the application p. 3, line 14-line 15, p. 4, line 4, figure 5.
Kusakabe etal : "A high dynamic range and high resolution projector with dual modulation", Proceedings of the SPIE—The International Society for Optical Engineering | vol. 7241 | 72410Q (11 pp.), 2009.
Touze et al: "High Dynamic range video distribution", PCS2013.
"HDR47 User and Installation manual" 2003.
Mantiuk_etal_Backward Compatible High Dynamic Range MPEG video compression, MPI Informatik, Saarbrucken, Germany, 2006.
Mantiuk_etal_lossy compression of high dynamic range images and video, MPI Informatik, Saarbucken, Germany, 2006.
ITU_T_REC_H.264, 2005 (equivalent to previously submitted—ISO IEC 14496-10 AVC, 2004).
Seetzen_high dynamic range display and projection system, thesis, University of British Coiurnbia,Vancouver, Apr. 2009.

\* cited by examiner

ENCODING AND DECODING METHODS FOR ADAPTING THE AVERAGE LUMINANCE OF HIGH DYNAMIC RANGE PICTURES AND CORRESPONDING ENCODER AND DECODER

This application claims the benefit, under 35 U.S.C. §365 of International Application PCT/EP2014/061342, filed Jun. 2, 2014, which was published in accordance with PCT Article 21(2) on Dec. 18, 2014 in English and which claims the benefit of European patent application EP 13305782.8, filed Jun. 10, 2013

1. FIELD OF THE INVENTION

The invention relates to the encoding of high dynamic range picture (HDR picture) especially in a distribution scenario. More precisely, a method and a device for encoding a HDR picture are disclosed. Corresponding decoding method and decoding device are also disclosed.

2. BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Low dynamic range pictures (LDR pictures) are pictures whose luminance values are represented with a limited number of bits (most often 8, 10 or 12 bits). This limited representation does not allow to correctly restitute small signal variations, in particular in dark and bright luminance's ranges. In HDR (High Dynamic Range) pictures, the signal representation is extended in order to keep a high accuracy of the signal on its entire range. In HDR pictures, pixels' value are usually represented in floating-point format (either 32-bit or 16-bit for each component), the most popular format being openEXR half-float format (16-bit per RGB component, i.e. 48 bits per pixel). Without compression, the size of a HDR picture in HD format (1920×1080 pixels) in openEXR half-float format is 99 532 800 bits. Considering a video at 25 fps, this approximately leads to a data rate of 2.488 Gbps. Since 7 Mbps is a typical data rate used for broadcast distribution, there is a need to compress and encode these HDR pictures.

Today, the majority of HDR encoding methods based on legacy encoders such as MPEG encoders requires the use of at least one professional encoder able to encode 12 or 14 bits content. Such professional encoders are expensive. In addition to the professional encoder, some of these methods use a 8 bit encoder for encoding a LDR version of the HDR pictures. The LDR picture is usually a tone mapped version of the HDR picture. Tone mapping is known to introduce artifacts.

Dual modulation methods are usually used in the dual modulation HDR displays. Such dual modulation HDR displays are made of two panels:
  one LED panel as a backlight panel that generates low resolution luminance picture of the scene; and
  one LCD panel that modulates the light coming from the LED panel to generate the resulting HDR picture.
In order to feed these two panels, a HDR picture is first decomposed in two separate LDR pictures, one picture is for the LED panel and the other one is for the LCD panel. Dual modulation methods are designed to deliver pictures with light levels that correspond to the value of the HDR input content, i.e. HDR input pictures with low data values produce dark pictures on the display while HDR with high data values produce bright pictures. On the other hand, MPEG encoders are designed for Rec. 709 standards that are standards with relative colorimetry, i.e. there is no physical relationship between the data value and the real luminance to be displayed. For these reasons, HDR content with dark scenes produces dark LCD panel data that are inefficiently encoded by MPEG encoders.

3. BRIEF SUMMARY OF THE INVENTION

The invention is aimed at alleviating at least one of the drawbacks of the prior art. To this aim, a method for encoding a sequence of high dynamic range pictures is disclosed. The method comprises for each picture of the sequence:
  obtaining a value representative of an average luminance of the high dynamic range picture;
  processing the high dynamic range picture so that a value representative of an average luminance of the processed picture is closer to a defined average luminance value than is the value representative of an average luminance of the high dynamic range picture;
  decomposing the processed high dynamic range picture in at least one first low dynamic range picture of same resolution as the high dynamic range picture and one second low dynamic range picture of lower resolution representative of a global illumination of the high dynamic range picture;
  encoding the first and second low dynamic range pictures and a data function of the value representative of an average luminance of the high dynamic range picture.
This solution can be implemented using a single consumer encoder.

According to a specific characteristic, the data is the value representative of an average luminance of the high dynamic range picture.

According to a specific embodiment, processing the high dynamic range picture comprises determining a gamma factor from the value representative of an average luminance of the high dynamic range picture and from the defined average luminance value and applying a gamma correction on the high dynamic range picture according to the gamma factor and wherein the data is the gamma factor or its inverse.

Gamma correction provides for a good balance between dark and bright areas and thus renders the following encoding of the two LDR pictures more efficient.

Advantageously, obtaining a value representative of an average luminance of the high dynamic range picture comprises:
  applying a logarithm function on the high dynamic range picture to get logarithm values and normalizing the logarithm values with respect to lowest and highest logarithm values to get normalized logarithm values;
  determining luminance values from the normalized logarithm values; and
  determining a median or mean value of the luminance values, the value representative of an average luminance being the median value or the average value.

According to a specific embodiment, processing the high dynamic range picture comprises applying a gamma correction on the normalized logarithm values according to a gamma factor, wherein the gamma factor equals the logarithm of the defined average luminance value divided by the logarithm of the value representative of an average luminance of the high dynamic range picture.

According to a specific characteristic, the defined average luminance is equal to 0.18.

Advantageously, the method further comprises temporally filtering over at least M high dynamic range pictures of the sequence the values representative of an average luminance determined for the M high dynamic range pictures, where M is an integer strictly superior to 1, wherein the processing of at least one picture of the M high dynamic range pictures uses the filtered value.

According to a variant, the method comprises, before applying a gamma correction, temporally filtering over at least M high dynamic range pictures of the sequence the gamma factors determined for the M high dynamic range pictures, where M is an integer strictly superior to 1, wherein applying a gamma correction on at least one picture of the M high dynamic range pictures uses the filtered gamma factor.

The temporal filtering preserves temporal coherency over the sequence.

A method for decoding a sequence of high dynamic range pictures is also disclosed. The method comprises for each picture of the sequence:
  decoding at least one first low dynamic range picture of same resolution as the high dynamic range picture and one second low dynamic range picture of lower resolution representative of a global illumination of the high dynamic range picture and a data function of a target value representative of an average luminance;
  reconstructing the high dynamic range picture from the first and second low dynamic range pictures; and
  processing, using the decoded data, the reconstructed high dynamic range picture so that a value representative of an average luminance of the processed picture is closer to the target value than is the value representative of an average luminance of the reconstructed high dynamic range picture.

According to a specific characteristic, the data decoded is the value representative of an average luminance.

According to a specific embodiment, processing the high dynamic range picture comprises determining a gamma factor from the decoded value representative of an average luminance and from a defined average luminance value and applying a gamma correction on the reconstructed high dynamic range picture according to the gamma factor.

According to a specific embodiment, the data is a gamma factor and wherein processing the high dynamic range picture comprises applying a gamma correction on the reconstructed high dynamic range picture according to the gamma factor.

An encoder for encoding a sequence of high dynamic range pictures is disclosed that comprises:
  means for obtaining, for each high dynamic range picture, a value representative of an average luminance of the high dynamic range picture;
  means for processing the high dynamic range picture so that a value representative of an average luminance of the processed picture is closer to a defined average luminance value than is the value representative of an average luminance of the high dynamic range picture;
  means for decomposing the processed high dynamic range pictures in at least one first low dynamic range picture of same resolution as the high dynamic range picture and one second low dynamic range picture of lower resolution representative of a global illumination of the scene; and
  means for encoding the first and second low dynamic range pictures and a data function of the value representative of an average luminance of the high dynamic range picture.

The encoder is configured to execute the steps of the encoding method.

A decoder for decoding a sequence of high dynamic range pictures is disclosed that comprises:
  means for decoding, for each high dynamic range picture, at least one first low dynamic range picture of same resolution as the high dynamic range picture and one second low dynamic range picture of lower resolution representative of a global illumination of the high dynamic range picture and a data function of a target value representative of an average luminance;
  means for reconstructing the high dynamic range picture from the first and second low dynamic range pictures; and
  means for processing, using the decoded data, the reconstructed high dynamic range picture so that a value representative of an average luminance of the processed picture is closer to the target value than is the value representative of an average luminance of the reconstructed high dynamic range picture.

The decoder is configured to execute the steps of the decoding method.

A data stream encoding a sequence of high dynamic range pictures is disclosed. The data stream comprises, for each picture of the sequence, data encoding at least one first low dynamic range picture of same resolution as the high dynamic range picture and one second low dynamic range picture of lower resolution representative of a global illumination of the high dynamic range picture and a data function of a value, called target value, representative of an average luminance of the high dynamic range picture, the data being for processing a high dynamic range picture reconstructed from the first and second low dynamic range pictures so that the value representative of an average luminance of the processed picture is closer to the target value than is the value representative of an average luminance of the reconstructed high dynamic range picture.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE INVENTION

A HDR picture is usually represented as a set of pixels. A triplet of color values such as (R, G, B) values is associated with each pixel. Such values are often but not necessarily floating point values that are represented on more than 8 bits. These pictures are usually captured by a HDR imaging system configured to capture a greater dynamic range between the lightest and darkest areas of a picture than current standard digital imaging. HDR pictures thus represent more accurately the range of intensity levels found in real scenes and are often captured by way of a plurality of differently exposed pictures of the same subject matter.

Figure 1:
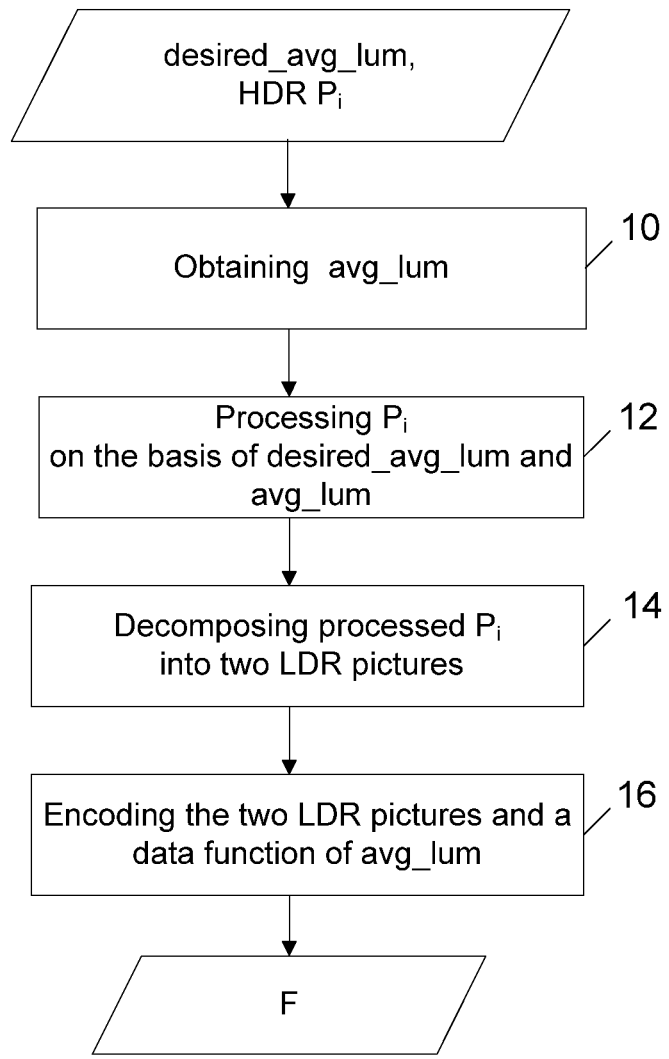
FIG. 1 depicts a flowchart of an encoding method according to a first embodiment of the invention.

A method for encoding a sequence of N HDR pictures is disclosed. N is an integer number greater than or equal to 1. In a first specific and non-limitative embodiment, the same steps are applied independently on each picture of the sequence in order to encode the whole sequence. FIG. 1 thus depicts a flowchart of the encoding method according to the first embodiment of the invention. More precisely, FIG. 1 depicts the steps of the encoding method applied on a current HDR picture $P_i$ of the sequence, where i is an integer index identifying the position of the picture in the sequence.

In a step 10, a value avg_lum representative of an average luminance of the current HDR picture $P_i$ is obtained. According to a specific embodiment obtaining this value comprises determining the value for example as depicts on FIG. 2. According to a variant, this value is obtained from a memory, optionally of a remote equipment of a communication network. Indeed, the value avg_lum can be determined by another application.

In a step 12, the HDR picture $P_i$ is processed on the basis of the value avg_lum and of a defined average luminance value desired_avg_lum to get a well-balanced brightness picture. More precisely, the HDR picture Pi is processed such that the corresponding average luminance value of the processed picture $P_i'$, denoted proc_avg_lum, is close to desired_avg_lum or at least closer than was avg_lum, i.e. |avg_lum−desired_avg_lum|>|proc_avg_lum−desired_avg_lum|. As an example, processing the HDR picture $P_i$ comprises applying a gamma correction. Thus, for each pixel of $P_i$ its value V is changed to $V^\gamma$, where γ is a gamma factor and equals to log 2(desired_avg_value)/log 2(avg_lum). By applying a gamma curve to the picture $P_i$, the average luminance value of the resulting picture is shifted from avg_lum to a value close to desired_median_value. Gamma correction generates well balanced brightness pictures that are more suitable for MPEG encoding, especially for the dark pictures. The defined average luminance value desired_avg_lum is defined such that the processed picture $P_i'$ is less costly to encode than $P_i$. Indeed, legacy encoders are defined to work in optimal conditions with well-balanced brightness pictures. Consequently, the desired_avg_lum is advantageously defined to be a middle grey also known as 18% grey. This grey is a tone that is perceptually about halfway between black and white on a lightness scale and thus corresponds to a well-balanced brightness picture for the human eye. Other values can be used for desired_avg_lum provided that the brightness of the processed picture $P_i'$ is better balanced than the brightness of $P_i$. Thus the corresponding average luminance value of the HDR picture is modified from avg_lum to a value proc_avg_lum close to desired_avg_lum.

In a step 14, the processed picture $P_i'$ is decomposed into first and second LDR pictures, wherein the first LDR picture has the same resolution as the HDR picture and wherein the second LDR picture which is of lower resolution than the HDR picture is representative of a global illumination of the HDR picture. The first LDR picture represents structures, details, etc of the scene. As an example, a dual modulation decomposition method is used for that purpose. The method disclosed in the paper from Oh entitled "*High dynamic range picture encoding for BrightSide display*" is an example of such dual modulation method. The advantage of dual modulation decomposition methods is to provide two 8-bits data planes that can be distributed using a single encoder (respectively decoder). The invention is not limited by a specific dual modulation decomposition method, i.e. it can use any dual modulation decomposition technique or global illumination map technique. More generally, any method providing such first and second LDR pictures from an HDR picture can be used.

In a step 16, the first and second LDR pictures are encoded in a stream F using a single encoder. A standard consumer MPEG encoder can be used for that purpose. More precisely, the first LDR picture is encoded using a classical encoding method (e.g. based on MPEG2, MPEG4, AVC, H.263, HEVC, etc) with temporal and spatial predictions. Such a method is well known by the one skilled in the art. Classically, it comprises determining residues, transforming the residues into coefficients using for example a DCT (English acronym of Discrete Cosine Transform), quantizing the coefficients and entropy coding the quantized coefficients. The second LDR picture of lower resolution is advantageously lossless encoded in the stream F for example as a supplemental enhancement information message (SEI message) or in user data. Such SEI messages are defined in several video coding standards and specifically in Annex D of ISO/IEC 14496-10:2005. According to a variant, the second LDR picture is encoded in the area of the picture that are known to be cropped on the decoder side. Indeed, for a 1920×1080 HD format, a input picture is 1920×1088 and 8 lines are cropped at the decoder side. These 8 lines are advantageously used to transport the data of the second LDR picture. In this case the corresponding data are encoded with no compression, for instance using IPCM (Intra Pulse Code Modulation) lossless coding mode. According to another variant, the data of the second LDR picture are lossless encoded in some active lines of the first LDR picture, e.g. using IPCM mode. In this case, these lines are replaced on the decoder side with black, white or grey color values to limit the artifacts. In addition to the two LDR pictures, a data is encoded in the stream F that is function of avg_lum. Indeed, this data is used on the decoder side to reverse the processing step 12. According to a specific characteristic of the invention, the data encoded is avg_lum. According to a variant, the gamma factor γ or its inverse 1/γ is encoded in the stream instead of avg_lum. According to a specific characteristic of the invention, the value desired_avg_lum is further encoded in the stream F. According to a variant, this value is not encoded and is known on the decoder side. The value desired_avg_lum is not encoded when the gamma factor γ or its inverse 1/γ is encoded.

Figure 2:
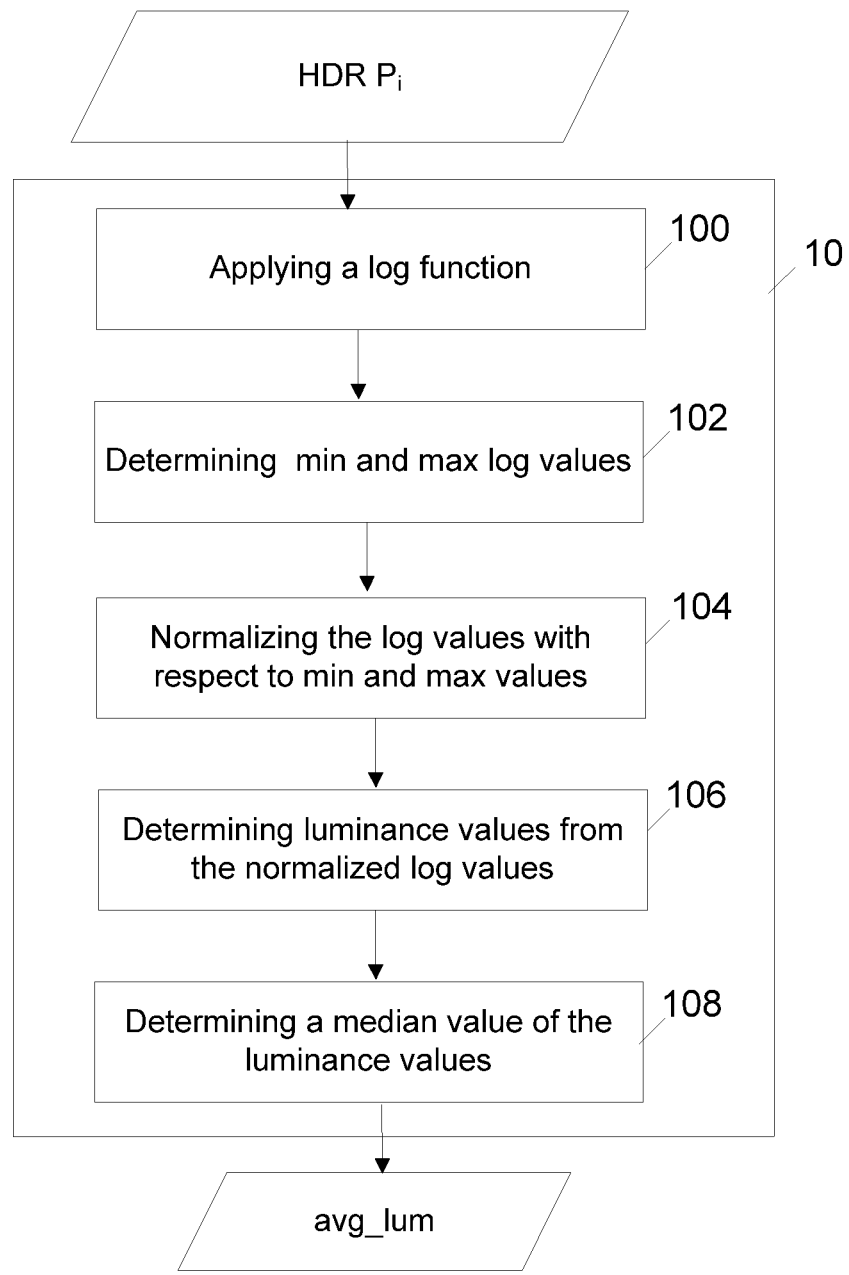
FIG. 2 depicts a detailed implementation of a step 10 of the encoding method according to the invention.

FIG. 2 depicts a detailed implementation of the step 10 of the encoding method according to a specific and non-limitative embodiment. In this particular embodiment, obtaining the value avg_lum comprises determining the value.

In a step 100, a log 2 function (i.e. logarithm to the base 2) is applied on the pixel values (R, G, and B values) of the HDR picture. Indeed, the shape of the log 2 function is considered to be a rough estimate of the human eye response to luminance.

In a step 102, the lowest and highest values of the pixel log 2 values are determined. The three components R, G, B can be considered together or independently. In the latter case, 3 lowest values and 3 highest values are thus determined. The lowest value is denoted min and the highest is denoted max. According to a variant, the values are obtained from a memory, optionally from remote equipment of a communication network.

In a step 104, the pixel log 2 values are normalized with respect to the determined min and max values. Consequently, the normalized log 2 values lie in the range [0;1].

In a step 106, the luminance values of the pixels are determined from the normalized log 2 values according to the following equation:

$$Y=0.2126*R+0.7152*G+0.0722*B,$$

where R, G and B are the normalized pixel log 2 values. This equation is usually used for transforming (R,G,B) components into (X,Y,Z) components. The invention is not limited to this specific equation. Indeed, other equations such as Y=0.299 R+0.587 G+0.114 B can be used. The equation is usually used for transforming (R,G,B) components into Rec. 709 (Y, U, V) components.

In a step 108, the value avg_lum representative of an average luminance value of the HDR picture $P_i$ is determined from the luminance values determined at step 106. As an example, avg_lum is set to the median value of the luminance values. According to a variant, avg_lum is set to the mean of all luminance values.

In the step 16, the min and max values are encoded in addition to the avg_lum value or in addition to γ or to 1/γ.

Figure 3:
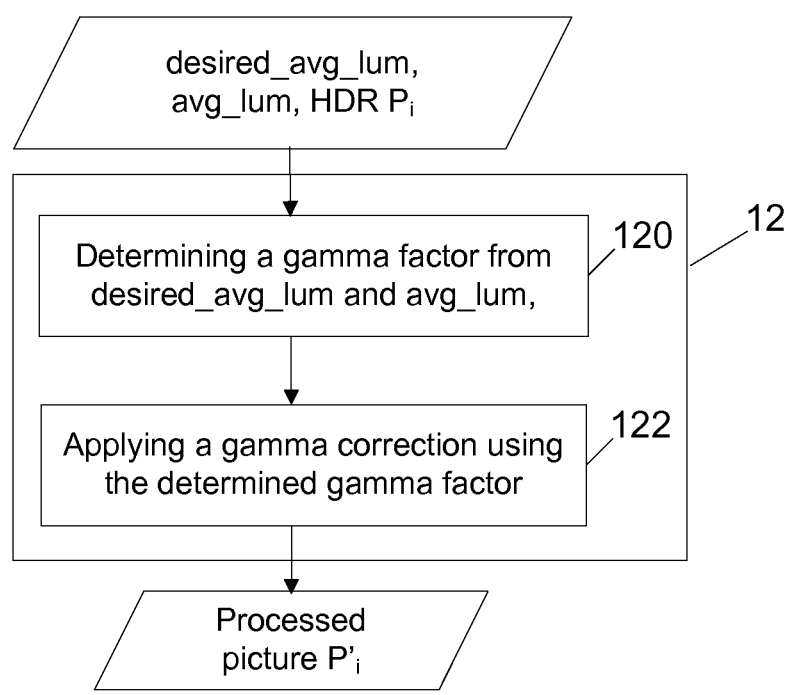
FIG. 3 depicts a detailed implementation of a step 12 of the encoding method according to the invention.

FIG. 3 depicts a detailed implementation of the step 12 of the encoding method according to a specific and non-limitative embodiment.

In a step 120 a gamma factor γ is determined from avg_lum and desired_avg_lum. The gamma factor is set to log 2(desired_avg_value)/log 2(avg_lum). The desired_avg_lum is for example set to 0.18 to correspond to a mid-grey. Any value other that improves the coding efficiency can be used.

In a step 122, a gamma correction is applied on the normalized log 2 values obtained at step 104. Thus, for each pixel of $P_i$ its normalized log 2 value V is changed to $V^γ$. By applying a gamma curve to the picture $P_i$, the average luminance value of the resulting picture is shifted from avg_lum to a value close to desired_median_value.

Figure 4:
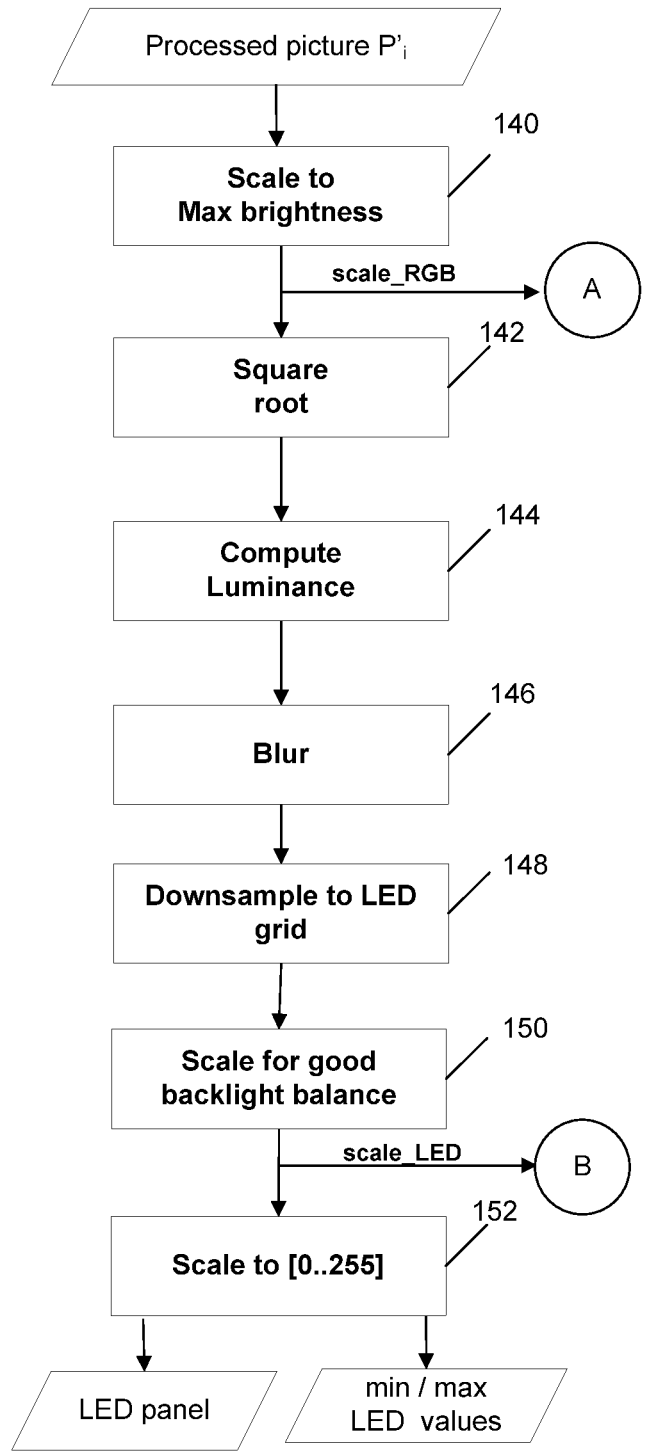
FIGS. 4 and 5 depict a detailed implementation of a step 14 of the encoding method according to the invention.
Figure 5:
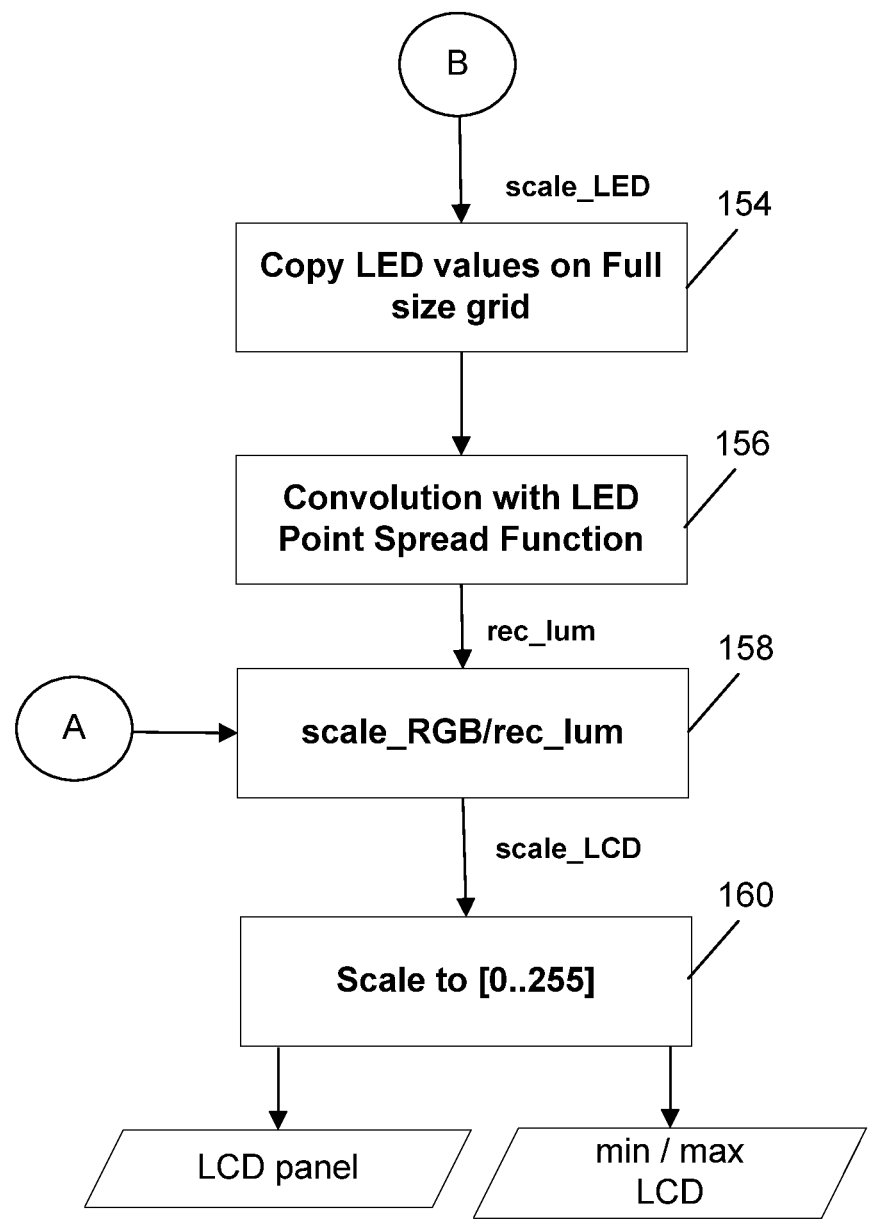

FIGS. 4 and 5 depict a detailed implementation of the step 14 of the encoding method according to a particular and non-limitative embodiment of the invention. Any other dual modulation method can be used, i.e. any method that produces a LDR picture of same resolution as the HDR picture and a LDR picture of lower resolution representing global illumination of the HDR picture.

In a step 140, the processed picture Pi' is scaled to a configurable max brightness value (for instance equal to 4000 cd/m2 that corresponds to the Sim2 HDR47 display max brightness value). The output of this step is a picture scale_RGB.

In a step 142, a square root is applied on the scale_RGB picture.

In a step 144, the luminance of the square root of scale_RGB is computed (for instance using the following equation Y=0.2126×R+0.7152×G+0.0722×B).

In a step 146, a blur function is applied (for instance a gaussian filter or interpolation filter) to have a coarse and low frequency representation of the luminance.

In a step 148, the blurred picture is downsampled to the LED grid. The step 146 makes the downsampling to the LED grid more robust to peaks (noise).

In a step 150, a scaling is performed on the LED values in order to take into account a further convolution with a LED Point Spread Function that increases each luminance pixel value due to the additive process of the convolution. The output of this step is a picture scale_LED.

In a step 152, the scale_LED picture is scaled between [0 . . . 255] in order to produce the LED panel values. The LED panel values and the min and max LED values before the [0 . . . 255] scaling are encoded as metadata (e.g. in SEI messages or user data) in the stream F. The LED panel values represent the data of the second LDR picture mentioned in step 16.

With reference to FIG. 5, in a step 154, the scale_LED picture is used to reconstruct the full resolution backlight picture by first copying each LED value on a full-size picture grid.

In a step 156, each copied value is convoluted with the LED Point Spread Function. The resulting picture is denoted rec_lum. Any PSF (English acronym of Point Spread Function) can be used for instance the PSF of the Sim2 HDR47 display or a PSF designed with a Gaussian kernel.

In a step 158, the rec_lum luminance picture is used to divide the scale_RGB picture to produce the scale_LCD picture.

In a step 160, the scale_LCD picture is finally scaled between [0 . . . 255] in order to produce the LCD panel values that are encoded in step 16. The min and max LCD values before the [0 . . . 255] scaling are encoded as metadata (e.g. in SEI messages or user data) in the stream F.

The LCD panel values represent the data of the first LDR picture mentioned in step 16.

The encoding method according to the invention is not display dependent, i.e. any LED panel resolution, any LED Point Spread Function and any LCD panel resolution can be used.

Figure 6:
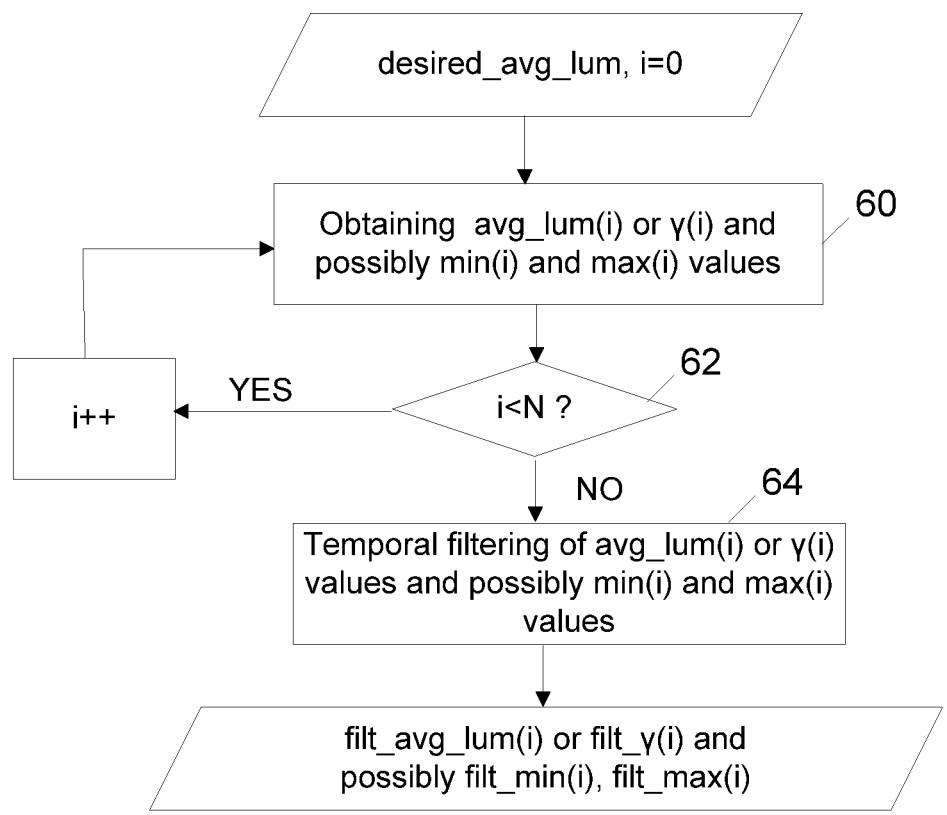
FIGS. 6 and 7 depict the flowchart of the encoding method according to a second embodiment of the invention.
Figure 7:
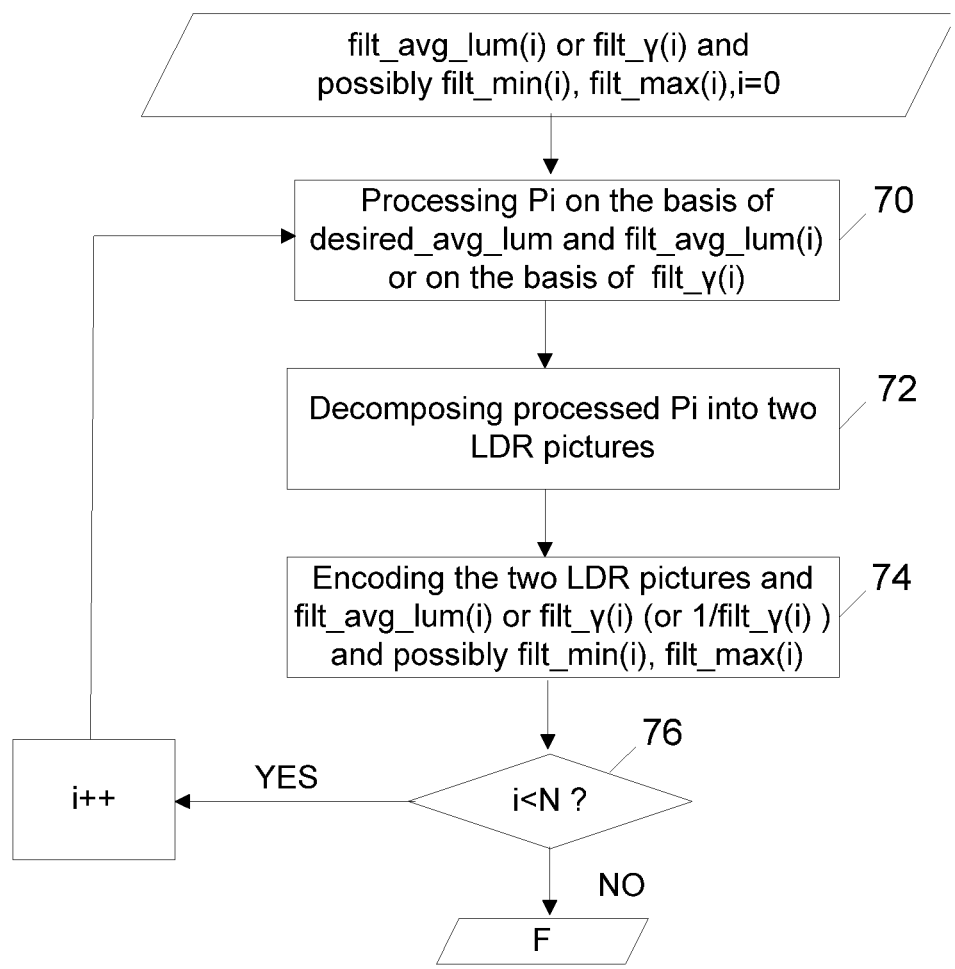

FIGS. 6 and 7 depict the flowchart of the encoding method according to a second non-limitative embodiment. On the figures the functional modules identical to the one of previous figures are identified on these figures with the same numerical references. According to this embodiment, the values avg_lum and possibly min and max values used for the normalization of the pixel log 2 values are temporally filtered over the video. The filtered values are then used during the processing step instead of the non-filtered values. By doing so, the avg_lum and possibly min and max values variations are smoothed over the sequence. Consequently, the pictures of the sequence have more brightness coherence which also improves coding efficiency. According to a variant, the gamma factors γ are filtered over the video instead of the values avg_lum. The filtered gamma factors are then used during the processing step instead of the non-filtered gamma factors.

Indeed, dual modulation methods work at the picture level and do not take into account the temporal aspect of a HDR video. In particular HDR video content is very sensitive to noise, leading to min and max data values that can be very different from picture to picture. Those min and max values are used in dual modulation algorithms to compute the luminance levels of the picture. Thus, when applying the dual modulation decomposition methods, brightness flickering appears mainly on the LCD panel that is to be encoded. This brightness flickering leads to incorrect matching between the same pixel of successive pictures and so this renders the inter prediction inefficient. Thus compression ratios are low. This is not an issue when the dual modulation is applied on a HDR picture to feed a HDR display but becomes one when the dual modulation is applied on a HDR picture to feed an encoder for further distribution of the stream.

With respect to FIG. 6, in a step 60, the avg_lum(i) and possibly min(i) and max(i) values are obtained for the picture P of index i. This step is identical to step 10 and all the variants disclosed for step 10 applies for step 60. Specifically, the values avg_lum(i) and possibly min(i) and max(i) values can be obtained from a memory or optionally from a remote equipment. According to a specific embodiment, a gamma factor γ(i) is determined for the picture P of index i from avg_lum(i) and desired_avg_lum. As an example, γ(i)=log 2(desired_avg_value)/log 2(avg_lum(i)).

In a step 62, the value of i is compared to N. If i<N, then the index i is incremented by 1 and the step 60 is repeated. If i>=N, then method continues to step 64.

In the step 64, the values avg_lum(i) (or γ(i) if such a value is determined in step 60) and possibly min(i) and max(i) are temporally filtered over the sequence to get filtered values filt_avg_lum(i) (resp. filt_γ(i)) and possibly filt_min(i) and filt_max(i). To this aim, a sliding window of size M is used that comprises the current picture $P_i$. The filtered value filt_avg_lum(i) (resp. filt_γ(i)) for the current picture is set as the mean of the values avg_lum(j) (resp. γ(i)) associated with the pictures $P_j$ in the sliding window. The same is done for min(i) and max(i). The current picture can be any picture in the sliding window (e.g. the first picture, the last picture, etc). The sliding window is then displaced by 1 picture to determine the filtered value for a next picture. According to a variant, the filtered values computed from the sliding window are associated with the M pictures in the sliding window and not only with the current picture. In this case, the sliding window is displaced by M pictures to determine the filtered values for next M pictures.

With respect to FIG. 7, in a step 70, the current HDR picture $P_i$ is processed with the filtered values filt_avg_lum(i) and possibly filt_min(i) and filt_max(i) to get a well-balanced brightness picture. The same variants disclosed for step 12 applies for step 70. As an example, processing the HDR picture $P_i$ comprises applying a gamma correction. Thus, for each pixel of $P_i$ its value V is changed to $V^\gamma$, where γ is a gamma factor and equals to log 2(desired_avg_value)/log 2(filt_avg_lum(i)). According to a variant, the current HDR picture $P_i$ is processed with the filtered gamma factor filt_γ(i) and possibly filt_min(i) and filt_max(i) to get a well-balanced brightness picture. Thus, for each pixel of $P_i$ its value V is changed to $V^\gamma$, where γ=filt_γ(i).

In a step 72, the HDR picture is decomposed in two LDR pictures. This step is identical to step 14.

In a step 74, the two LDR pictures are then encoded with filt_avg_lum(i) (resp. filt_γ(i)) and possibly filt_min(i) and filt_max(i) values. According to a variant, filt_γ(i) or 1/filt_γ(i) are encoded instead of filt_avg_lum(i). Otherwise, this step is identical to step 16.

In a step 76, the value of i is compared to N. If i<N, then the index i is incremented by 1 and the method continue with step 70 otherwise the method ends.

Figure 8:
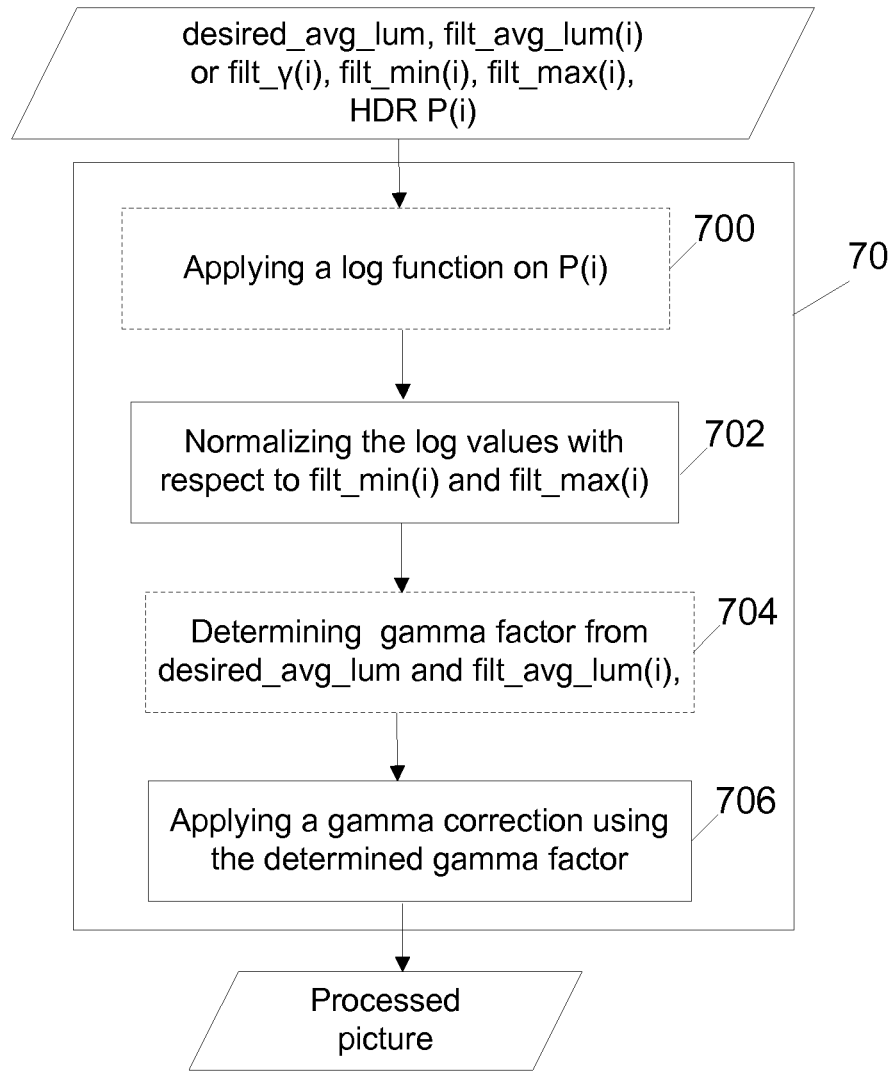
FIG. 8 depicts a detailed implementation of a step 70 of the encoding method according to the invention.

FIG. 8 depicts a detailed implementation of the step 70 of the encoding method according to a specific and non-limitative embodiment.

In a step 700, a log 2 function (i.e. logarithm to the base 2) is applied on the pixel values (R, G, and B values) of the HDR picture. This step can be avoided by storing the log 2 values already determined in step 100.

In a step 702, the log 2 values are then normalized with respect to the filtered min and max values associated with picture P(i), i.e. filt_min(i) and filt_max(i). Consequently, the normalized log 2 values lie in the range [0;1].

In a step 704, a gamma factor γ is determined from the filtered filt_avg_lum(i) and desired_avg_lum. The gamma factor is thus set to log 2(desired_avg_value)/log 2(filt_avg_lum(i)). The desired_avg_lum is for example set to 0.18 to correspond to a mid-grey. Any value that improves the coding efficiency can be used. If gamma factors are filtered in step 64 instead of the values avg_lum, then this step is not implemented.

In a step 706, a gamma correction is applied on the log values normalized with respect to the filtered min/max values. Thus, for each pixel its normalized log value V is changed to $V^\gamma$, where γ is either the gamma factor determined in step 704 or the filtered gamma factor filt_γ(i) obtained in step 64.

Figure 9:
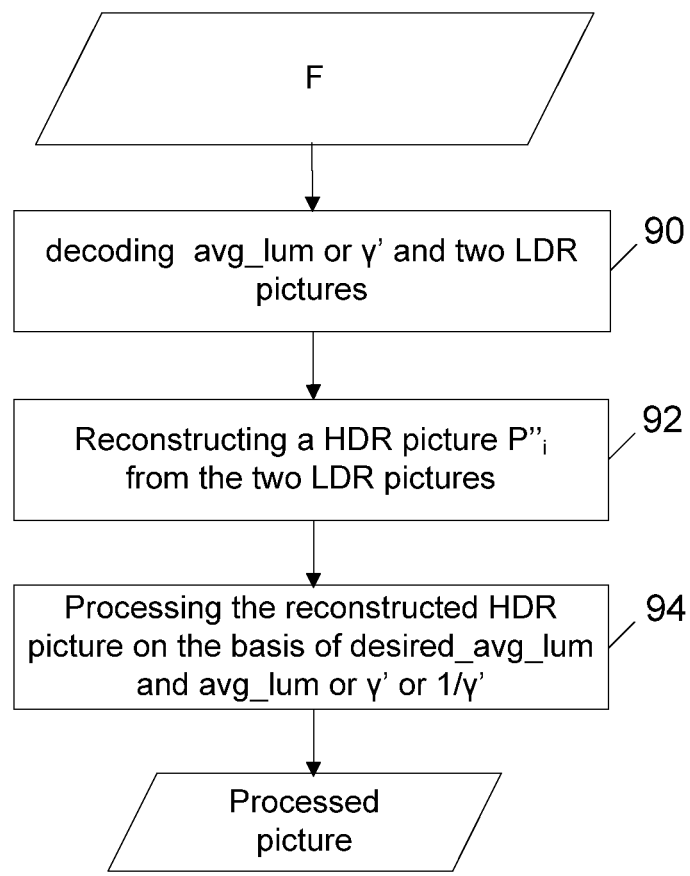
FIG. 9 depicts a flowchart of a decoding method according to a specific embodiment of the invention.

A method for decoding a sequence of N HDR pictures is further disclosed. In a specific and non-limitative embodiment, the same steps are applied independently on each picture of the sequence in order to encode the whole sequence. FIG. 9 thus depicts a flowchart of the decoding method according to this specific embodiment of the invention. More precisely, FIG. 9 depicts the steps of the decoding method applied for a current HDR picture $P_i$ of the sequence, where i is an integer index identifying the position of the picture in the sequence.

In a step 90, Two LDR pictures are decoded from the stream F, wherein the second LDR picture which is of lower resolution than the HDR picture to be reconstructed is representative of the global illumination of the HDR picture. The first LDR picture which is of same resolution as the HDR picture represents structures, details, etc of the scene. A data is decoded from the stream F that is function of a target value representative of an average luminance avg_lum. Indeed, this data is used on the decoder side to reverse the processing step 12. According to a specific embodiment, the data decoded from the stream is the value avg_lum. desired_avg_lum, min and max values if present in the stream F are also decoded. According to a variant, the data decoded from the stream is a gamma factor γ' which is function of avg_lum. The gamma factor γ' is decoded from the stream instead of avg_lum, where the value of γ' is either equal to the value of γ used on the encoder side or to the value 1/γ. This step is the inverse of the encoding step 16. All the variants disclosed with respect to step 16 are thus applicable to step 90.

In a step 92, a HDR picture $P_i''$ is reconstructed from the decoded LDR pictures. This step is the inverse of the decomposition step 14. Consequently, an inverse dual modulation is applied. All the variants disclosed with respect to step 14 are thus applicable to step 92.

In a step 94, the reconstructed HDR picture $P_i''$ is processed on the basis of the value avg_lum and of a defined average luminance value desired_avg_lum or on the basis of γ'. The step 94 is the inverse of the step 12. All the variants disclosed with respect to step 12 are thus applicable to step 94. More precisely, the reconstructed HDR picture $P_i''$ is processed such that the corresponding average luminance value of the processed picture is close to decoded avg_lum or at least closer than was the corresponding average luminance value of the reconstructed picture $P_i''$. As an example, processing the reconstructed HDR picture $P_i''$ comprises applying a gamma correction. Thus, for each pixel of $P_i''$ its value V is changed to $V^{\gamma'}$, where $\gamma'$=log 2(avg_lum)/log 2(desired_avg_value) or $\gamma'$ is the gamma factor decoded in step 90. According to a variant, each pixel of $P_i''$ its value V is changed to $V^{1/\gamma'}$, where $\gamma'$ is the gamma factor decoded in step 90. The desired_avg_lum is either a constant value known by the decoder or can be sent to the decoder in the stream F. In this case this value is decoded from the stream in step 90.

Figure 10:
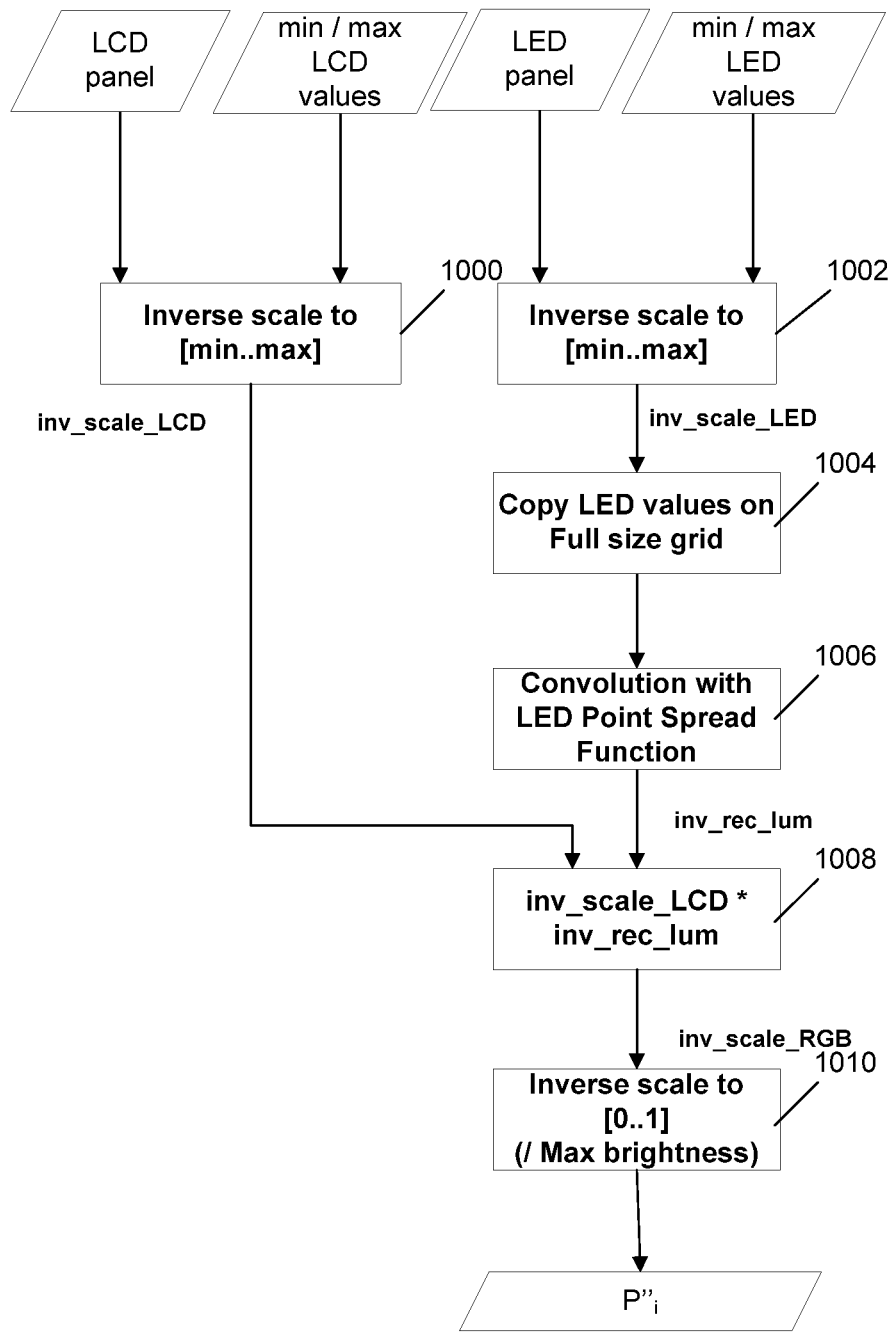
FIG. 10 depicts a detailed implementation of a step 92 of the decoding method according to the invention.

FIG. 10 depicts a detailed implementation of the step 92 of the encoding method according to a particular and non-limitative embodiment of the invention. Any other inverse dual modulation method can be used. According to this specific embodiment, the first LDR picture decoded at step 90 is a LCD panel whose pixels are associated with decoded LCD panel values and the second LDR picture is a LED panel whose pixels are associated with decoded LED panel values.

In a step 1000, decoded LCD panel values are inverse scaled using decoded min and max LCD values to produce the inv_scale_LCD picture (reconstructed version of the Dual modulation scale_LCD picture).

In a step 1002, decoded LED panel values are inverse scaled using decoded min and max LED values coming to produce the inv_scale_LED picture (reconstructed version of the Dual modulation scale_LED picture). As for the Dual modulation, the inv_scale_LED picture is used to reconstruct the full resolution backlight picture by first copying in a step 1004, each LED value on a full-size picture grid and convoluting, in a step 1006, each copied value with the chosen LED Point Spread Function to produce the inv_rec_lum picture (reconstructed version of the Dual modulation rec_lum picture). The inv_rec_lum picture and the inv_scale_LED picture are then multiplied to produce the inv_scale_RGB picture (reconstructed version of the Dual modulation scale_RGB picture) that is normalized in a step 1010 by dividing by the configurable max brightness value (for instance 4000 cd) to produce the reconstructed HDR picture $P_i''$.

Figure 11:
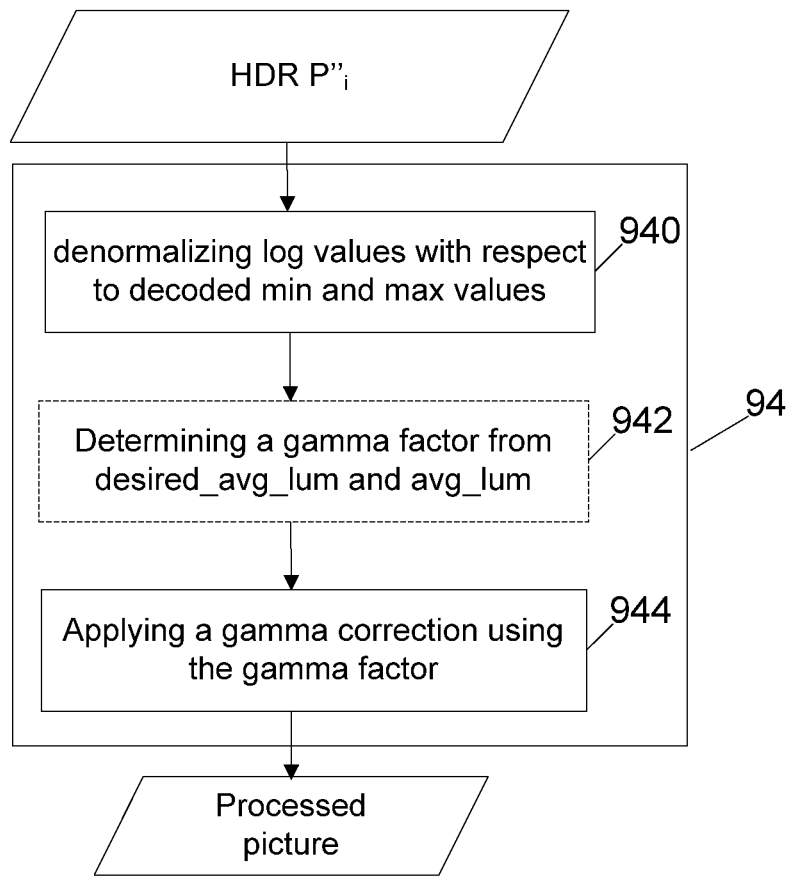
FIG. 11 depicts a detailed implementation of a step 94 of the decoding method according to the invention.

FIG. 11 depicts a detailed implementation of the step 94 of the decoding method according to the invention.

In a step 940, the pixel values of the reconstructed HDR picture $P_i''$ are denormalized with respect to min and max values decoded from the stream F in step 90. An inverse log 2 function is then applied on the denormalized pixel values. This step is the inverse of step 702 on the encoding side. The min and max values are those possibly encoded in the stream F at steps 16 or 74.

In a step 942, a gamma factor $\gamma$ is determined from avg_lum and desired_avg_lum. The gamma factor is set to log 2(avg_lum)/log 2(desired_avg_value). The desired_avg_lum is for example set to 0.18 to correspond to a mid-grey. Any value that improves the coding efficiency can be used. desired_avg_lum has the same value than the one used in the encoding. If gamma factors are decoded in step 90 instead of the values avg_lum, then this step is not implemented.

In a step 944, a gamma correction is applied on the values obtained at step 940. Thus, for each pixel, its value V is changed to $V^{\gamma'}$, where $\gamma'$ is either the gamma factor determined in step 942 or the gamma factor decoded in step 90. According to a variant, the value V of each pixel is changed to $V^{1/\gamma'}$, where $\gamma'$ is the gamma factor decoded in step 90. This step is inverse of the step 122.

The invention also relates to a data stream such as the stream F produced by the encoding method according to the invention. The data stream according to the invention comprises data encoding a sequence of high dynamic range pictures. Specifically, it comprises, for each HDR picture of the sequence, data encoding at least one first low dynamic range picture of the same resolution as the HDR picture and one second low dynamic range picture of lower resolution representative of a global illumination of the scene determined from the high dynamic range picture and a data (e.g. avg_lum, filt_avg_lum(i), $\gamma$(i), 1/$\gamma$(i), filt_$\gamma$(i) or 1/filt_$\gamma$(i)) function of a value avg_lum representative of an average luminance of the high dynamic range picture. Optionally, it further comprises the values min and max obtained at step 102 or possibly filtered at step 64. These values (avg_lum, filt_avg_lum(i), $\gamma$(i), 1/$\gamma$(i), filt_$\gamma$(i) or 1/filt_$\gamma$(i)) are for processing a high dynamic range picture reconstructed from said first and second low dynamic range pictures so that the value representative of an average luminance of said processed picture is closer to said value representative of an average luminance of said high dynamic range picture than is the value representative of an average luminance of said reconstructed high dynamic range picture.

Figure 12:
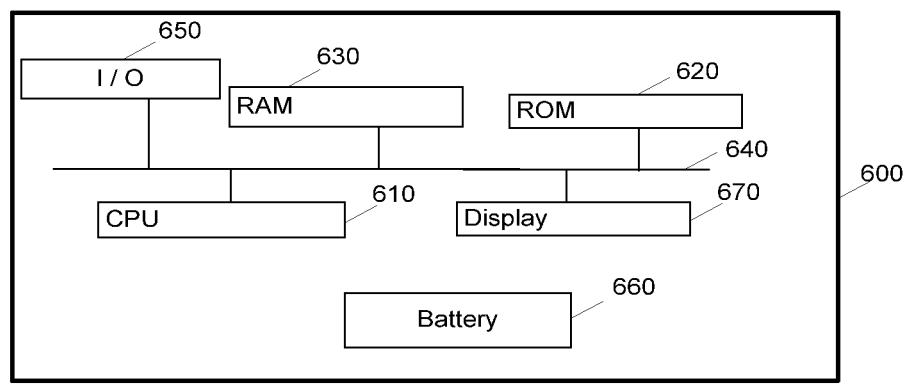
FIG. 12 represents an encoder according to the invention.

FIG. 12 represents an exemplary architecture of an encoder 60. Encoder 60 comprises following elements that are linked together by a data and address bus 640:

- at least one processor 610 (or CPU, English acronym of "Central Processing Unit" and/or GPU, English acronym of "Central Processing Unit"), which is, for example, a DSP (or Digital Signal Processor);
- one or several memory(ies) such as a RAM (or Random Access Memory) 630 and possibly ROM (or Read Only Memory) 620;
- one or several I/O (Input/Output) interface(s) 650 adapted to display user information and/or allow a user to enter data or parameters (e.g. a keyboard, a mouse, a touchpad, a webcam); and
- a power source 660.

According to a variant, the power source 660 is external to the encoder. Each of these elements of FIG. 12 are well known by those skilled in the art and won't be disclosed further. In each of mentioned memory, the word <<register>> used in the specification designates in each of the memories mentioned, both a memory zone of low capacity (some binary data) as well as a memory zone of large capacity (enabling a whole program to be stored or all or part of the data representative of data calculated or to be displayed). RAM 630 comprises in a register, the program executed by the processor 610 and uploaded after switch on of the encoder 60, input data in a register, processed data in different state of the encoding method in a register, and other variables used for encoding in a register. When switched on, the processor 610 uploads the program in the RAM 630 and executes the corresponding instructions.

Figure 13:
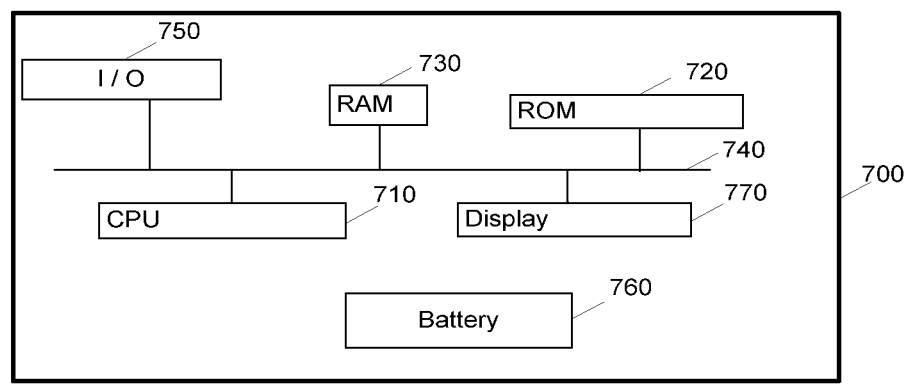
FIG. 13 represents a decoder according to the invention.

FIG. 13 represents an exemplary architecture of a decoder 700. Decoder 700 comprises following elements that are linked together by a data and address bus 740:

- at least one processor 710 (e.g CPU/GPU), which is, for example, a DSP (or Digital Signal Processor);
- one or several memory(ies) such as a RAM (or Random Access Memory) 730 and possibly ROM (or Read Only Memory) 720;
- one or several Input/Output interface(s) 750 adapted to display user information and/or allow a user to enter data or parameters (e.g. a keyboard, a mouse, a touchpad, a webcam); and a power source 760.

According to a variant, the power source 760 is external to the encoder. Each of these elements of FIG. 13 are well known by those skilled in the art and won't be disclosed further. In each of mentioned memory, the word <<register>> used in the specification can correspond to area of small capacity (some bits) or to very large area (e.g. a whole program or large amount of received or decoded data). When switched on, the CPU 710 uploads the program in the RAM and executes the corresponding instructions.

RAM 730 comprises, in a register, the program executed by the CPU 710 and uploaded after switch on of the decoder 700, input data in a register, decoded data in different state of the decoding method in a register, and other variables used for the decoding in a register.

According to variants, encoder and decoder compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a sequence of high dynamic range pictures, said method comprising for each high dynamic range picture of said sequence:
   obtaining a current value representative of an average luminance of said high dynamic range picture;
   processing said high dynamic range picture so that a value representative of an average luminance of said processed picture is closer to a defined average luminance value than is the current value;
   decomposing said processed high dynamic range picture in at least one first low dynamic range picture of same spatial resolution as said high dynamic range picture and one second low dynamic range picture of lower spatial resolution representative of a global illumination of said high dynamic range picture;
   encoding said first and second low dynamic range pictures and at least one data item, wherein said data item is function of said current value.

2. The method of claim 1, wherein the data item is the current value.

3. The method of claim 1, wherein processing said high dynamic range picture comprises determining a gamma factor from said current value and from said defined average luminance value and applying a gamma correction on said high dynamic range picture according to the gamma factor and wherein said data item is said gamma factor or its inverse.

4. The method of claim 1, wherein obtaining a current value representative of an average luminance of said high dynamic range picture comprises:
applying a logarithm function on said high dynamic range picture to get logarithm values and normalizing said logarithm values with respect to lowest and highest logarithm values to get normalized logarithm values;
determining luminance values from said normalized logarithm values; and
determining a median or mean value of said luminance values, the current value being said median value or said average value.

5. The method of claim 4, wherein processing said high dynamic range picture comprises applying a gamma correction on said normalized logarithm values according to a gamma factor, wherein the gamma factor equals the logarithm of the defined average luminance value divided by the logarithm of the current value.

6. The method according to claim 1, wherein the defined average luminance is representative of a middle grey.

7. The method of claim 1, further comprising temporally filtering over at least M high dynamic range pictures of said sequence the current values representative of an average luminance determined for said M high dynamic range pictures, where M is an integer strictly superior to 1, wherein the processing of at least one picture of said M high dynamic range pictures uses the filtered value.

8. The method of claim 3, further comprising, before applying a gamma correction, temporally filtering over at least M high dynamic range pictures of said sequence the gamma factors determined for said M high dynamic range pictures, where M is an integer strictly superior to 1, wherein applying a gamma correction on at least one picture of said M high dynamic range pictures uses the filtered gamma factor.

9. A method for decoding a sequence of high dynamic range pictures, the method comprising for each high dynamic range picture of said sequence:
decoding at least one first low dynamic range picture of same spatial resolution as said high dynamic range picture and one second low dynamic range picture of lower spatial resolution representative of a global illumination of said high dynamic range picture and at least one data item which is function of a target value representative of an average luminance;
reconstructing said high dynamic range picture from said first and second low dynamic range pictures; and
processing, using the decoded data item, said reconstructed high dynamic range picture so that a value representative of an average luminance of said processed picture is closer to said target value than is the value representative of an average luminance of said reconstructed high dynamic range picture.

10. The method of claim 9, wherein the data item decoded is the target value.

11. The method of claim 10, wherein processing said reconstructed high dynamic range picture comprises determining a gamma factor from said target value and from a defined average luminance value and applying a gamma correction on said reconstructed high dynamic range picture according to the gamma factor.

12. The method of claim 9, wherein the data item is a gamma factor and wherein processing said high dynamic range picture comprises applying a gamma correction on said reconstructed high dynamic range picture according to the gamma factor.

13. An encoder for encoding a sequence of high dynamic range pictures comprising at least a processor configured to:
obtain, for each high dynamic range picture, a current value representative of an average luminance of said high dynamic range picture;
process said high dynamic range picture so that a value representative of an average luminance of said processed picture is closer to a defined average luminance value than is the current value;
decompose said processed high dynamic range picture in at least one first low dynamic range picture of same spatial resolution as said high dynamic range picture and one second low dynamic range picture of lower spatial resolution representative of a global illumination of said high dynamic range picture; and
encode said first and second low dynamic range pictures and at least one data item, wherein said data item is function of said current value.

14. A decoder for decoding a sequence of high dynamic range pictures comprising at least a processor configured to:
decode, for each high dynamic range picture, at least one first low dynamic range picture of same spatial resolution as said high dynamic range picture and one second low dynamic range picture of lower spatial resolution representative of a global illumination of said high dynamic range picture and at least one data item which is function of a target value representative of an average luminance;
reconstruct said high dynamic range picture from said first and second low dynamic range pictures; and
process, using the decoded data item, said reconstructed high dynamic range picture so that a value representative of an average luminance of said processed picture is closer to said target value than is the value representative of an average luminance of said reconstructed high dynamic range picture.

15. A non-transitory processor readable medium having stored thereon a data stream encoding a sequence of high dynamic range pictures comprising, for each high dynamic range picture of said sequence, data encoding at least one first low dynamic range picture of same spatial resolution as said high dynamic range picture and one second low dynamic range picture of lower spatial resolution representative of a global illumination of said high dynamic range picture and at least one data item which is function of a target value representative of an average luminance of said high dynamic range picture, said data item being for processing a high dynamic range picture reconstructed from said first and second low dynamic range pictures so that the value representative of an average luminance of said processed picture is closer to said target value than is the value representative of an average luminance of said reconstructed high dynamic range picture.

16. The encoder of claim 13, wherein the data item is the current value.

17. The encoder of claim 13, wherein processing said high dynamic range picture comprises determining a gamma factor from said current value and from said defined average luminance value and applying a gamma correction on said high dynamic range picture according to the gamma factor and wherein said data item is said gamma factor or its inverse.

18. The encoder of claim 13, wherein obtaining a current value representative of an average luminance of said high dynamic range picture comprises:
applying a logarithm function on said high dynamic range picture to get logarithm values and normalizing said logarithm values with respect to lowest and highest logarithm values to get normalized logarithm values;

determining luminance values from said normalized logarithm values; and determining a median or mean value of said luminance values, the current value being said median value or said average value.

19. The encoder of claim 18, wherein processing said high dynamic range picture comprises applying a gamma correction on said normalized logarithm values according to a gamma factor, wherein the gamma factor equals the logarithm of the defined average luminance value divided by the logarithm of the current value.

20. The encoder according to claim 13, wherein the defined average luminance is representative of a middle grey.

21. The encoder of claim 17, further comprising temporally filtering over at least M high dynamic range pictures of said sequence the current values representative of an average luminance determined for said M high dynamic range pictures, where M is an integer strictly superior to 1, wherein the processing of at least one picture of said M high dynamic range pictures uses the filtered value.

22. The encoder of claim 2, further comprising, before applying a gamma correction, temporally filtering over at least M high dynamic range pictures of said sequence the gamma factors determined for said M high dynamic range pictures, where M is an integer strictly superior to 1, wherein applying a gamma correction on at least one picture of said M high dynamic range pictures uses the filtered gamma factor.

23. The decoder of claim 14, wherein the data item decoded is the target value.

24. The decoder of claim 23, wherein processing said reconstructed high dynamic range picture comprises determining a gamma factor from said target value and from a defined average luminance value and applying a gamma correction on said reconstructed high dynamic range picture according to the gamma factor.

25. The decoder of claim 14, wherein the data item is a gamma factor and wherein processing said high dynamic range picture comprises applying a gamma correction on said reconstructed high dynamic range picture according to the gamma factor.

* * * * *